(12) United States Patent
Percec et al.

(10) Patent No.: US 8,323,534 B2
(45) Date of Patent: Dec. 4, 2012

(54) THERMOPLASTIC ELECTROCHROMIC MATERIALS

(75) Inventors: Simona Percec, Philadelphia, PA (US); Joel M. Pollino, Elkton, MD (US)

(73) Assignee: E I du Pont de Nemours and Company, Wilmington, DE (US)

( * ) Notice: Subject to any disclaimer, the term of this patent is extended or adjusted under 35 U.S.C. 154(b) by 83 days.

(21) Appl. No.: 12/641,449

(22) Filed: Dec. 18, 2009

(65) Prior Publication Data

US 2011/0147680 A1 Jun. 23, 2011

(51) Int. Cl.
*G02B 5/23* (2006.01)
*H01B 1/00* (2006.01)
*H01B 1/12* (2006.01)
*G02F 1/15* (2006.01)

(52) U.S. Cl. ... 252/586; 252/500; 264/211; 264/211.21; 359/265; 359/267; 359/273; 359/275; 359/359; 438/69; 438/70; 528/378; 528/379; 528/380

(58) Field of Classification Search ............... 252/586, 252/500; 359/265, 267, 273, 275, 359, 360, 359/580; 428/437, 213, 339, 141, 156, 167, 428/172, 212, 415, 426, 432, 433, 436, 469, 428/699, 701, 702, 913; 438/69, 70; 524/308, 524/306, 399, 400; 264/211, 211.21; 528/378, 528/379, 380
See application file for complete search history.

(56) References Cited

U.S. PATENT DOCUMENTS

| | | | |
|---|---|---|---|
| 5,434,207 A | 7/1995 | Fischer | |
| 5,482,767 A | 1/1996 | Karagiannis et al. | |
| 5,529,849 A | 6/1996 | D'Errico | |
| 5,547,736 A | 8/1996 | Simon et al. | |
| 5,595,818 A | 1/1997 | Hopfe et al. | |
| 5,618,863 A | 4/1997 | D'Errico et al. | |
| 5,631,315 A | 5/1997 | D'Errico | |
| 5,728,472 A | 3/1998 | D'Errico | |
| 5,886,075 A | 3/1999 | Keane et al. | |
| 5,910,854 A | 6/1999 | Varaprasad et al. | |
| 6,093,471 A | 7/2000 | Hopfe et al. | |
| 6,154,306 A * | 11/2000 | Varaprasad et al. | 359/273 |
| 6,372,352 B1 | 4/2002 | Bletsos et al. | |
| 6,451,435 B1 | 9/2002 | Klafka et al. | |
| 6,924,919 B2 | 8/2005 | Hunia et al. | |
| 2003/0137713 A1 | 7/2003 | Lomprey et al. | |
| 2005/0136243 A1 | 6/2005 | Fisher | |

FOREIGN PATENT DOCUMENTS

| | | |
|---|---|---|
| EP | 0612826 B1 | 10/2000 |
| EP | 1268195 B1 | 11/2003 |
| WO | 9603475 A1 | 2/1996 |
| WO | 9734186 A1 | 9/1997 |
| WO | 9842796 A1 | 10/1998 |
| WO | 9844386 A1 | 10/1998 |
| WO | 2006008776 A1 | 1/2006 |
| WO | 2007149090 A1 | 12/2007 |
| WO | 2007149091 A1 | 12/2007 |
| WO | WO 2007/149091 A1 * | 12/2007 |

OTHER PUBLICATIONS

Weber, J. H. et al., Complexes Derived From Strong Field Ligands. XIX. Magnetic Properties of Transition Metal Derivatives of 4,4',4'',4'''-Tetrasulfophthalocyanine, Inorganic Chemistry, vol. 4, No. 4, (1965), pp. 469-471.
Arnold, K. et al., Electron Autodetachment From Isolated Nickel and Copper Phthalocyanine-Tetrasulfonate Tetraanions: Isomer Specific Rates, J. Phys. Chem. A, vol. 107 (2003), pp. 794-803.
Mortimer, R. J. et al., Electrochromic Organic and Polymeric Materials for Display Applications, Displays, vol. 27 (2006), pp. 2-18.
Bhowmik, P. K. et al., Main-Chain Viologen Polymers With Organic Counterions Exhibiting Thmerotropic Liquid-Crystalline and Fluorescent Properties, Journal of Polymer Science, Part A: Polymer Chemistry, vol. 40 (2002), pp. 659-674.
Chidichimio, G. et al., Solid Thermoplastic Laminable Electrochromic Film, Chem. Mater., vol. 19 (2007), pp. 353-358.

* cited by examiner

*Primary Examiner* — Bijan Ahvazi
(74) *Attorney, Agent, or Firm* — Kevin S. Dobson (57) ABSTRACT

Disclosed are electrochromic materials containing a film-forming polymer with a $T_g$ less than 100° C.; a plasticizer; an electrochromophore; an electron mediator; and a salt. Also disclosed are electrochromic devices using such electrochromic materials that can provide light-filtering, color-modulation, or reflectance-modulation in variable transmittance windows, variable-reflectance mirrors and other dynamic glazing applications.

7 Claims, 3 Drawing Sheets

THERMOPLASTIC ELECTROCHROMIC MATERIALS

FIELD OF THE INVENTION

The present invention relates to thermoplastic electochromic materials. The materials are useful in electrochromic devices.

BACKGROUND

Electrochromic devices that provide variable transmittance of light can have application in windows, mirrors, and various display devices. Commercially available electrochromic devices are most commonly composed of multiple layers containing at least: i) two conductive electrodes, often coated or printed onto glass or other transparent substrates, ii) an inorganic and/or organic chromophore layer, and iii) a liquid or gel electrolyte layer. The major disadvantage of such a multilayer system is its complexity and the requirement that expensive sputtering or chemical vapor deposition technologies be used in its manufacture. Furthermore, it is not easy to prepare large surface area devices using these technologies.

Another disadvantage is that large electrochromic devices employing liquid electrolytes sandwiched between glass supports can develop large hydrostatic forces, which can break or separate from the glass supports. If the glass supports break, the liquid electrolytes can spill. In addition, systems prepared using a gel/liquid electrolyte layer are susceptible to deactivation when laminated at high temperatures.

The use of gel electrolytes can mitigate spillage issues, but gels do not provide adhesion between the substrates, and hence cannot be used with thin (weight-conserving) glass substrates.

Conductive polymers have also been employed for dynamic glazing applications, but they suffer from high cost and poor processibility.

Solid-state, single-layer electrochromic devices based on polyvinylbutyral (PVB) are known. These systems can be prepared using solution methods, but when such compositions are prepared using melt-processing technologies, the electrochromic response of the device is retarded. Systems prepared using solution methods are also susceptible to deactivation when laminated at high temperatures.

In-situ polymerization of a mixture comprising a polymerizable monomer, an electrochromic compound, solvent(s) and plasticizer(s) has also been used to create solid electrochromic films. Typically, however, such films do not provide adhesion between the substrates.

Recently, solid plastic electrochromic films prepared by introducing electrochromic molecules and plasticizers into preformed solid thermoplastic polymers have been disclosed. Such films do not require any solvent evaporation or UV polymerization, and can be laminated between two pieces of conductive glass to form electrochromic devices.

Electrochromic compositions comprising an amorphous (co)polymer, an electrochromophore, an ion source, and optionally an electron mediator and a plasticizer have also been disclosed. The electrochromophore comprises a polyalkyleneoxide and an electrochromic moiety.

Nevertheless, there remains a need for an easily manufactured, free-standing electrochromic film that can be laminated between glass or other substrates to create a device that exhibits large changes in light transmission between its "on" and "off" states.

SUMMARY

One aspect of the present invention is an electrochromic composition comprising:

a. 10-60 wt % of a polymer selected from the group of amorphous, film-forming polymers with $T_g$ less than 100° C.;
b. 45-70 wt % of a plasticizer, wherein the plasticizer is soluble in the polymer to at least 45 wt %;
c. 1-30 wt % of an electrochromophore, wherein the electrochromophore is soluble in the plasticizer to at least 10 wt %;
d. 0.1-10 wt % of an electron mediator selected from the group consisting of ferrocene, butyl ferrocene, ferrocene carboxylic acid, phenazine and its derivatives, carbazole and its derivatives, phenothiazine and its derivatives, and phenanthroline and its derivatives; and
e. 0.1-10 wt % of a salt selected from the group consisting of lithium chloride, tetrabutylammonium bromide, lithium bis(trifluoromethanesulfonyl)imide, lithium triflate, and lithium hexafluorophosphate, wherein the melting point of the plasticizer is not above about 0° C., the boiling point of the plasticizer is above about 190° C. at a pressure of 1 atmosphere, and the solubility in the plasticizer of the electrochromophore, the electron mediator and the salt are each at least 0.05 mg per mg of plasticizer.

DETAILED DESCRIPTION

Disclosed herein are polymeric electrochromic blends containing moderate to high amounts (40-75%) of high boiling/low melting plasticizers or co-plasticizers that can be processed using melt technology. Free-standing electrochromic films prepared by melt technology can be laminated between conductive substrates such as ITO-glass or ITO-PET to yield solid-state, single-layer, electrochromically active devices that are tolerant to lamination temperatures.

Suitable amorphous film-forming polymers with $T_g$ less than 100° C. include PVB (polyvinyl butyral), PVC (polyvinyl chloride), polycarbonates, polyacrylates, polyvinyl alcohols (PVA), acrylate (co)polymers, copolymers of ethylene and vinyl alcohol, ethylene-acrylate copolymers, terpolymers of ethylene-CO-acrylate terpolymers, and polyurethanes.

Poly(vinylbutyral) is a terpolymer comprised of (a) vinyl butyral (about 69-84%), (b) vinyl alcohol (about 15-30%), and (c) vinyl acetate (about 1%).

PVB

In one embodiment, PVB is a terpolymer in which a=79-80%; b=19-20%; and c=1% or less. In one embodiment, a=69.82, b=29.18, and c=1.

Suitable plasticizers are compatible with both the polymer and additives such as electrochromophores, salts, and electron mediators. More particularly, suitable plasticizers are miscible with the film-forming polymer, the electrochromophore(s), the electron mediator(s), and the salt component(s). It is also desirable for the plasticizer to be a polar molecule, with a moderately high dielectric constant to increase ion mobility. In some embodiments, the dielectric constant of the plasticizer is between 5 and 65, or between 10 and 50, or between 15 and 35. Suitable plasticizers have sufficiently high boiling points so that the plasticizer does not leave the film over time or with weathering. In some embodiments, the boiling point of the plasticizer is above 150° C., or above about 165° C., or above 180° C., or above about 200° C. at 1 atmosphere. It is also desirable for the plasticizer to have a sufficiently low melting point so that it will plasticize without crystallizing. In some embodiments, the melting point of the plasticizer is not above about 0° C., or not above about −10° C., or not above about −20° C. Suitable plasticizers are relatively inert, and do not react with any of the additives or with the film-forming polymer. They also do not interfere with the redox chemistry associated with the color change.

Suitable plasticizers include compounds according to Structure 1,

Structure 1 where each X is independently selected from the group of O, S, NH, and NR';
R' is H or a $C_1$-$C_8$ alkyl group;
each Y is independently selected from the group consisting of $C_4$-$C_{12}$ linear or branched alkyl groups, optionally substituted with one to six OH groups, or both Ys taken together are where each A is independently selected from the group consisting of H and $C_4$-$C_{12}$ linear or branched alkyl groups, optionally substituted with one to six OH groups, and wherein the boiling point is at least 150° C. and the melting point is not above 0° C. When X=O, the compounds of Structure 1 are commonly referred to as "carbonates." When X=S, NH or NR', the compounds of Structure 1 can be referred to as "carbonate derivatives."

Suitable carbonate plasticizers include cyclic [1,3]dioxolan-2-ones, cyclic oxazolidin-2-ones, cyclic imidazolidin-2-ones, cyclic [1,3]dithiolan-2-ones, [1,3]oxathiolan-2-ones, and substituted derivatives. Carbonates such as [1,3]dioxolan-2-one are inherently polar and aprotic, and possess high dielectric constants that facilitate ion solubility and migration under applied potential. They are also miscible with viologen electro-chromophores. Some examples of suitable carbonates and carbonate derivatives for use as plasticizers are shown below, where R is a $C_4$-$C_{12}$ linear or branched alkyl group, optionally substituted with one to six OH groups.

Suitable carbonated derivatives include bis-substituted, linear, oligomeric, and polymeric derivatives. Some examples are shown below.

where R and A are as defined above.

Suitable plasticizers also include bis-cyclics, of Structure II,

Structure II where X is O, S, or NH; and
Z is a linking group selected from $CH_2$, $C(CH_3)_2$, $CHCH_3$, $CH_2CH_2$, $CH_2CH_2CH_2$, O, S, SO, $SO_2$, NH, $N(CH_3)$, C=O, C(O)O, C(O)NH, $CH_2$C=O, $CH_2$C(O)O, $CH_2$C(O)NH, $CH_2$C(O)$CH_2$, and A is as defined above. Examples include:

Bis
[1,3]Dioxolan-2-ones

Bis
Oxazolidin-2-ones

Bis
Imidazolidin-2-ones

Bis-substituted
[1,3]Dioxolan-2-ones

Bis-substituted
Oxazolidin-2-ones

Bis-substituted
Imidazolidin-2-ones

Bis
[1,3]Dithiolan-2-ones

Bis-substituted
[1,3]Dithiolan-2-ones

Bis
[1,3]Oxathiolan-2-ones

-continued

Bis-substituted
[1,3]Oxathiolan-2-ones

In some embodiments, the plasticizer is selected from the following:

Propylene carbonate    4-(Hydroxymethyl)-1,3-dioxolan-2-one

Carbonic acid dibutyl ester

Suitable plasticizers also include substituted pyrrolidon-2-ones, dihydrofuran-2-ones, piperidin-2-ones, and pyran-2-ones, where each A and each R is independently defined as above.

Substituted          Substituted           Substituted
Pyrrolidin-2-one   Dihydrofuran-2-one   Piperidin-2-ones

Substituted
Pyran-2-ones

Specific examples of suitable 2-pyrrolidones and dihydrofuran-2-ones plasticizers include:

1-(3-Hydroxypropyl)-2-pyrrolidone

-continued

1-Octyl-2-pyrrolidone

5-Dodecanolide

Substituted imidazolium salts (ionic liquids) can also be used as plasticizers in some embodiments, including ionic liquids of Structure III Structure III

An = Cl, Br, F, $PF_6$, $BF_4$, OTf, OTs, OMs where A and R are as defined above. An example of a suitable ionic liquid is 1-hexyl-3-methylimidazolium chloride:

Imidazolium salts, including 1-ethyl-methyl-1H-imidazolium chloride, can also be used as salts.

Suitable plasticizers also include alcohols and polyols such as $C_7$-$C_{10}$ linear primary alcohols, linear or branched $C_5$-$C_{12}$ aliphatic diols and triols, benzyl alcohol (BzOH) and 1-phenoxy-2-propanol (P2P). In some embodiments, the alcohol contains a cycloaliphatic substitutent. Specific examples include:

2,2-Dimethyl-1,3-hexanediol

2-Methyl-1,3-pentanediol 1,3-Pentanediol, 1-cyclohexyl-2-methyl-,

-continued 1,3-Nonanediol 1,5-Pentanediol, 2,4-diethyl

1-Phenoxy-2-propanol 1,5-Octanediol, 2-butyl nonanol

3-Methylpentane-1,3,5-triol

2-Ethyl-1,3-hexanediol benzyl alcohol
(BzOH)

3-methyl-1,5-pentanediol

EHD
2-Ethyl-hexane-1,3-diol

Suitable plasticizers also include substituted sulfur and phosphorous compounds such as those shown below.

where each R is independently selected from the group consisting of $C_4$-$C_{12}$ linear or branched alkyl groups, optionally substituted with one to six OH groups. Specific examples of suitable substituted phosphorus and sulfur plasticizers include:

(2-Ethyl-hexyl)-phosphonic acid diphenyl ester

Bis(2-ethylhexyl) phosphate

Octyl Diphenyl Phosphate
(S141)

Tributyl phosphate

Tris(2-ethylhexyl)phosphate

3-Methanesulfinylmethyl-heptane

Suitable electrochromophores include monomeric and polymeric viologen compounds:

Monomeric Viologen

Polymeric and Branched Viologen where each $R^2$ is independently selected from the group consisting of $C_1$-$C_{1,000,000}$ alkyl, poly(ethylene glycol), wherein the alkyl or poly(ethylene glycol) groups may be branched or linear and may be hydroxylated; $X^1$ is a monovalent anion, e.g., $Cl^-$, $Br^-$, $F^-$, $I^-$, $ClO_4^-$, tosylate, mesylate, triflate or sulfonate; $R^3$ is $C_1$-$C_{10,000}$ alkylene or —$(CH_2CH_2O)$; d=1-1,000,000; and n=1,000-1,000,000. In some embodiments, the electrochromophore comprises a poly(ethylene glycol) segment with an Mw (molecular weight) of about 100 to about 2000. In some embodiments, the poly(ethylene glycol)

segment has an Mw of about 200 or about 1000. Copolymers of poly(ethylene glycol) and 4,4'-dipyridyl can be synthesized by halogenation of polyethylene glycol with thionyl halide (e.g., SOCl₂ or SOBr₂), followed by conversion of the resulting halide to quaternary polymeric salts via the Menshutkin reaction with 4,4'-dipyridyl.

In one embodiment, the electrochromophore is a copolymer of 4-4'-dipyridyl and brominated poly(ethylene glycol), where the poly(ethylene glycol) unit possesses an average molecular weight of 200 Daltons. In another embodiment, the copolymer possesses an average molecular weight of 1,000 Daltons.

In one embodiment, the electrochromophore is a copolymer of 4-4'-dipyridyl and chlorinated poly(ethylene glycol), where the poly(ethylene glycol) unit possesses an average molecular weight of 200 Daltons.

Suitable electron mediators include ferrocene (Fc), butyl ferrocene (Bu-Fc), ferrocene carboxylic acid (Fc-COON) and 5,10dihydro-5,10dimethyl phenazine.

In some embodiments, the electrochromic composition further comprises other additives, for example propylene carbonate (PC). Although PC boils at 240° C. and is immiscible with PVB, it can be added in small amounts in conjunction with other plasticizers to increase the dielectric constant of the electrochromic composition.

Electrochromic compositions suitable for use in making free-standing films can be made by mixing together and optionally heating the electrochromophore, the plasticizer, the electron mediator, and the salt for a time sufficient to at least partially dissolve the solids in the plasticizer. This mixture can then be melt-blended or melt-compounded with the film-forming polymer by standard techniques (e.g. injection molding, hot-pressing, calendaring, or extrusion) to prepare free-standing films.

The electrochromic compositions can be used in electrochromic devices. For example, an electrochromic device comprises:

a. a first substrate with a conductive surface;
b. a second substrate with a conductive surface; and
c. a composition of an electrochromic composition comprising:
   i. 10-60 wt % of a polymer selected from the group of amorphous, film-forming polymers with $T_g$ less than 100° C.;
   ii. 45-70 wt % of a plasticizer, wherein the plasticizer is soluble in the polymer to at least 45 wt %;
   iii. 1-30 wt % of an electrochromophore, wherein the electrochromophore is soluble in the plasticizer to at least 5 wt %;
   iv. 0.1-10 wt % of an electron mediator selected from the group consisting of ferrocene, butyl ferrocene, ferrocene carboxylic acid, phenazine and its derivatives, carbazole and its derivatives, phenothiazine and its derivatives, and phenanthroline and its derivatives; and
   v. 0.1-10 wt % of a salt selected from the group consisting of lithium chloride, tetrabutylammonium bromide, lithium bis(trifluoromethanesulfonyl)imide, lithium triflate (LiSO₃CF₃), and lithium hexafluorophosphate, wherein the melting point of the plasticizer is not above about 0° C., the boiling point of the plasticizer is above about 190° C. at a pressure of 1 atmosphere, and the solubility in the plasticizer of the electrochromophore, the electron mediator and the salt are each at least 0.05 mg per mg of plasticizer, and wherein the composition is in contact with the conductive surfaces of the first and second substrates.

Electrochromic devices can be made by laminating a piece of the free-standing electrochromic film between two conductive substrates. Suitable conductive substrates include indium tin oxide-coated glass (ITO-glass) and indium tin oxide-coated polymer sheets, e.g., ITO-coated poly(ethylene terephthalate) (PET) or ITO-coated poly(ethylene naphthalate). Typically, the oxide coating is on only one surface of the glass or polymer sheet. In some embodiments, the ITO is replaced with or used in conjunction with doped tin oxide or doped zinc oxide, or conductive, transparently thin carbon surfaces such as graphite, graphene, or carbon nanotubes. In some embodiments, one of the conductive substrates is opaque, e.g., a conductive metal sheet or foil.

The electrochromic film can be used as one continuous film disposed between the conductive substrates. Alternatively, the electrochromic film can be patterned, with one or more holes of chosen shape. In some embodiments, more than one piece of electrochromic film of desired size and shape can be disposed between the conductive substrates.

Figure 1:
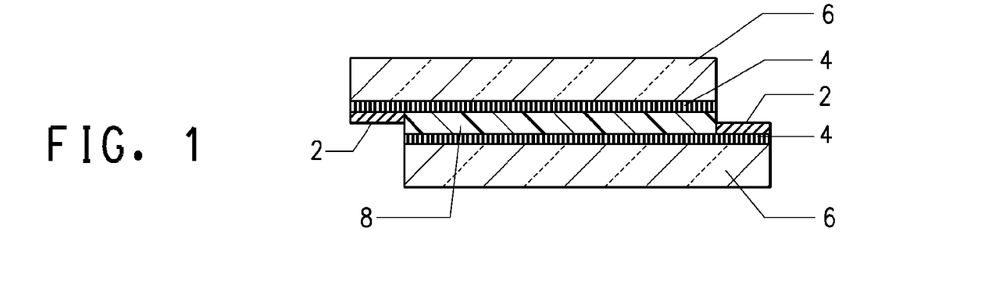
FIG. 1 illustrates a side view of a lamination assembly depicting a staggered device configuration.

FIG. 1 depicts one embodiment of an electrochromic device. The glass substrates 6 are each coated with a transparent, conductive ITO layer 4. Disposed between the ITO layers 4 is a layer of electrochromic material 8. The glass substrates are staggered to facilitate the placement of electrical leads onto the copper tape 2 onto the opposing ITO layers 4.

To be operated, the conductive surfaces of the electrochromic device, or electrodes attached to the conductive surfaces, are connected to a power source to provide a variable potential across the electrochromic layer. The power source can be any AC or DC power source known in the art. However, if an AC source is used, control elements, such as diodes, are placed between the power source and the electrodes to insure that the potential difference between the electrodes does not change in polarity with variations in polarity of the potential from the source. Suitable DC power sources include batteries. The power from the power source is controlled by any means known in the art so that the potential across the electrochromic material disposed between the electrodes of the device does not exceed the potential difference at which irreversible reactions might occur. In some embodiments, the control of power delivered to the electrodes will be such that the potential can be varied over a range from about 0.1 volt to a potential somewhat below that at which irreversible reactions occur. Typical potentials are 0.1-10 volts, or 0.2-5 volts, or 0.1-3 volts. It is also useful to provide a switch associated with the power source so that the potential between the electrodes of the device can be reduced to zero by open-circuiting or short-circuiting. It is also useful to provide a switch to enable the application of a potential of reversed polarity across the electrochromic material.

In order for the electrochromic material to be oxidized or reduced, and thereby cause a change in the transmittance of light through the device, the potential difference between the electrodes is high enough to cause a current to flow across the electrochromic material between the conductive substrates. A potential difference of about 0.1 volts and about 1.2 volts is usually adequate to cause current to flow and the electrochromic material to change color.

The extent of color change at steady state will depend on the potential difference between the electrodes and the particular nature of the electrochromophore.

The rate at which steady state is achieved, at a given potential across yhte electrochromic material of the device, is dependent on the current at that potential. This current is generally not regarded as an independent variable in the operation of the device, as it depends on other factors that are independently varied, such as the composition and conductivity of the electrochromic material, and the potential across the electrochromic material. However, the currents that flow during normal device operation are typically in the range of 0.1 to 30 milliamperes per square centimeter of cathode or anode area in contact with the electrochromic material.

In some embodiments, the electrochromic material is substantially colorless or only slightly colored in its "off" state, i.e., at steady state in the absence of a potential difference across this electrochromic material. Application of a potential difference causes an increase in color due to redox reactions of the electrochromophore, and a corresponding decrease in the amount of light transmitted through the electrochromic device. Removal of the potential difference causes a return to the "off" state and the original transmittance of the device.

EXAMPLES

General

The following plasticizers, electrochromophores, salts, and electron mediators were used in the examples and comparative examples. Unless otherwise indicated, all reagents are available from commercial sources.

Plasticizers:

Triethylene glycol di-(2-ethylhexanoate) (3GO)

3GO

Octyl Diphenyl Phosphate (S141)
1-Phenoxy 2-propanol (Dowanol PPh) (P2P)
2-Ethyl-hexane-1,3-diol (EHD)
Propylene Carbonate (PC)
Benzyl Alcohol (BzOH)

Electrochromophores:

V-200: A copolymer of 4-4'-dipyridyl and poly(ethylene glycol), where the poly(ethylene glycol) unit possesses an average molecular weight of 200 Daltons and the anion is a bromide. The synthesis of this compound follows that of V-1000 (given below), except that poly(ethylene glycol) of MW=200 g/mol was used in place of poly(ethylene glycol) of MW=1,000 g/mol.

V-1000: A copolymer of 4-4'-dipyridyl and poly(ethylene glycol), where the poly(ethylene glycol) unit possesses an average molecular weight of 1000 Daltons and the anion is a bromide. The synthesis of this compound is given below.

V-200-Cl: A copolymer of 4-4'-dipyridyl and poly(ethylene glycol), where the poly(ethylene glycol) unit possesses an average molecular weight of 1000 Daltons and the anion is a chloride. The synthesis of this compound is given below.

Salts:

Lithium chloride (LiCl)
Tetrabutylammonium bromide
Lithium triflate (LiOTf)

1-ethyl-methyl-1H-imidazolium chloride 1-ethyl-methyl-1H-imidazolium chloride

Electron Mediators:

Ferrocene (Fc)
Butyl ferrocene (Bu-Fc)
5,10dihydro-5,10dimethyl phenazine

The following procedures were used in the examples and comparative examples:

Plasticizer-Electrochromic Additive Solubility

To determine the compatibility between a particular plasticizer and an electrochromic additive such as a salt, an electrochromophore, or an electron mediator, 100 mg of the additive was added to a stirred vial containing 2000 mg of plasticizer. The resultant mixture was allowed to stir for 30 min at room temperature, at which point the vial was visually inspected. If the resultant solution was not clear, the solubility was qualitatively designated "insoluble."

If the additive was soluble, as determined by clarity of the resultant solution, additional aliquots of additive were added in 100 mg portions, stirred for 30 min, and inspected until the additive would no longer dissolve in the plasticizer. Attempts to dissolve greater than 1000 mg of an additive were not made. Solubility was quantified by the equation:

$$S = W_f / W_P$$

where S=solubility, $W_f$=weight of dissolved electrochromic additive (mg), and $W_P$=weight of plasticizer (mg).

Polymer-Plasticizer Compatibility

Two methods were used to determine the extent to which a polymer absorbs a plasticizer.

Method A: A series of PVB films possessing levels of plasticizer ranging from 0-80% were made by casting films from methanol solutions containing poly(vinylbutyral) flake and plasticizer into a Teflon® dish. The resultant films were allowed to dry for 48 hr in a nitrogen chamber. To approximate the onset of exudation, each film was visually inspected for transparency/clarity and for the presence of oil droplets on the surface. Placing a paper towel on the film samples was found to enhance visual detection, as the porous surface of a paper towel absorbs transferred liquid exudates, providing excellent visual contrast. The composition prior to the onset of exudation was deemed "compatible," while higher loadings of plasticizer were deemed "incompatible." The compatibility of plasticizers with other polymer films can be determined in a similar way.

Method B: Films prepared as described in Film Preparation Method A (below) underwent DSC analysis in which the film sample was heated and cooled between −60° C. and 150° C. at a rate of 20° C./min. Each sample underwent two heat-cool cycles. The second heat cycle was used to determine the glass transition temperature ($T_g$). The glass transition temperatures for a series of blends were plotted as a function of plasticizer level. From this data, the point at which polymer was saturated by a particular plasticizer was determined by noting the plasticizer level at which the effectiveness of a plasticizer to lower the glass transition temperature of a blend levels off. This point was considered the "point of saturation." Exudation affords an additional, second-order transition, which arises from the enthalpy of melting for unincorporated, incompatible residual plasticizer. The composition for which this second transition is observed is called the "point of exudation."

Figure 4:
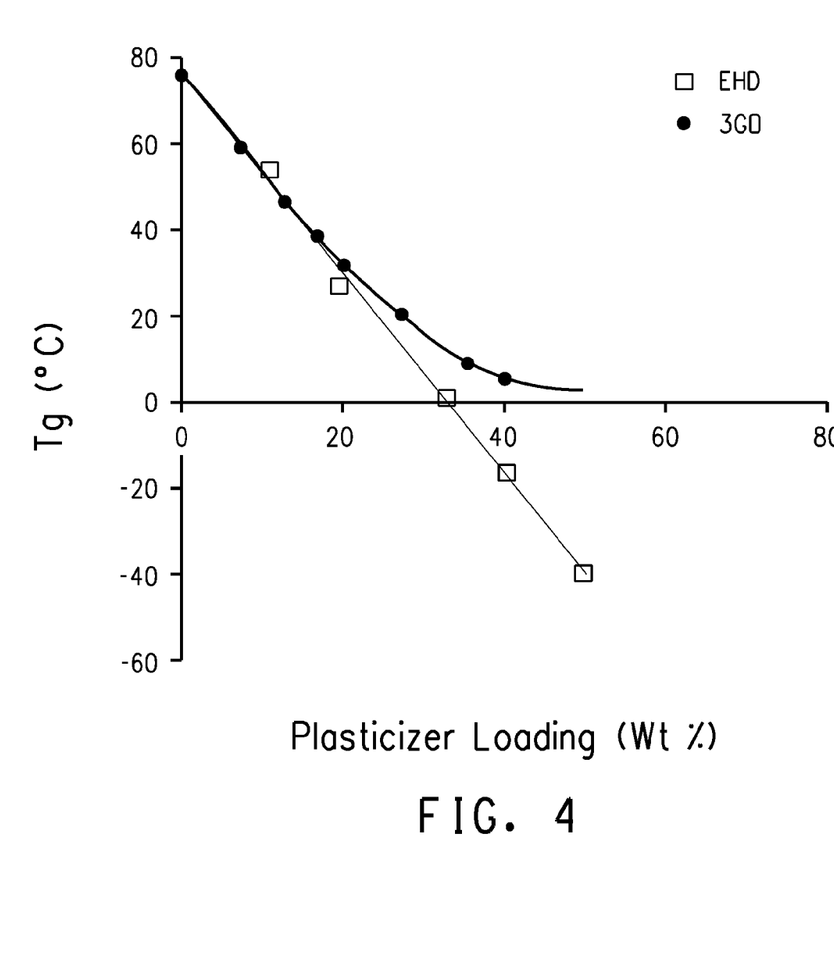
FIG. 4 shows the $T_g$ of PVB/plasticizer blends vs. plasticizer loading for two PVB plasticizers, EHD and 3GO.

Example plots of $T_g$ vs plasticizer level showing a highly PVB compatible plasticizer (2-ethyl-hexane-1,3-diol (EHD)) versus a moderately compatible plasticizer (triethylene glycol di-(2-ethylhexanoate) (3GO)) are shown in FIG. 4.

Melt Compounding

Compositions for melt compounding were prepared by stirring a mixture of an electrochromophore, an electron mediator, a salt and a plasticizer overnight at 50° C. The resultant viscous, and in some cases partially soluble, mixture was subsequently combined with polymer flake, agitated using a spatula, and fed into the hopper of equipment designed for polymeric melt blending. Two methods for melt compounding were employed:

Method A: Melt blending was conducted using a DSM Micro Explor™ (15 cc capacity) twin screw co-rotating extruder at a temperature of about 145° C., a screw speed of about 100 rpm, a hold time of about 5 min, and a head pressure of about 20-60 psi. The melt blended composition was extruded in the form of a strand.

Method B: Melt blending was carried out using a Brabender Plasti-Corder (60 cc capacity) melt mixer at a temperature of about 90-110° C., a screw speed of 100 rpm, and a hold time of about 10 minutes. The compounded material was subsequently allowed to cool, then manually removed from the mixing head in the form of a polymeric mass.

Film Preparation

Electrochromic films were prepared by two processes, depending on the method used for melt compounding:

Method A: Thermoplastic electrochromic blends prepared by 'Melt Compounding Method A' were directly cast using a film die of 5-10 mil spacing, and a temperature of 155° C. The resultant film was extruded onto wax paper and rolled prior to lamination.

Method B: Thermoplastic electrochromic blends prepared by 'Melt Compounding Method B' were converted to film using a hot press and metal shim. Compounded thermoplastic blends (~10 g) were cut into small pieces and sandwiched between two 6"×6" brass plates covered with a sheet of Kapton® film and a 4"×4" stainless steel shim with a thickness of 15 mil or 30 mil. The resultant assembly was placed between the platens of a pre-heated hydraulic press, and subjected to a softening cycle (2,000 psig, 60 sec, 100° C.), a pressing cycle (12,000 psig, 60 sec, 100° C.), and a cooling cycle (0 psig, 2 min, 25° C.). The resultant film was cut from the shim and stored between two sheets of polyethylene.

Device Construction

Method A: Electrochromic film prepared as described in 'Film Preparation Method A' or 'Film Preparation Method B' was cut to dimension and applied to the conductive surface of a square piece of ITO-glass, 1"×1", ~60 ohm/sq. A second square piece of ITO-glass (1"×1", ~60 ohm/sq) was placed on the electrochromic film so that the conductive face of the ITO made contact with the electrochromic film. The edges of two pieces of glass were staggered so that the opposing edges of the ITO-glass surface extended beyond the edge (FIG. 1). The resultant sandwich was then taped to a ¼" glass back plate and placed in a silicone envelope vacuum bag equipped with an inner interflow breather pattern, a type J thermocouple, and a vacuum port connected to a pressure regulated diaphragm pump. Lamination was accomplished by placing the sealed vacuum bag assembly in a preheated oven (90-100° C., 30 psig) for 15-20 min. After lamination, the device was allowed to cool and a copper tape buss bar was applied along the edges of the exposed surface of ITO (FIG. 1).

Figure 2A:
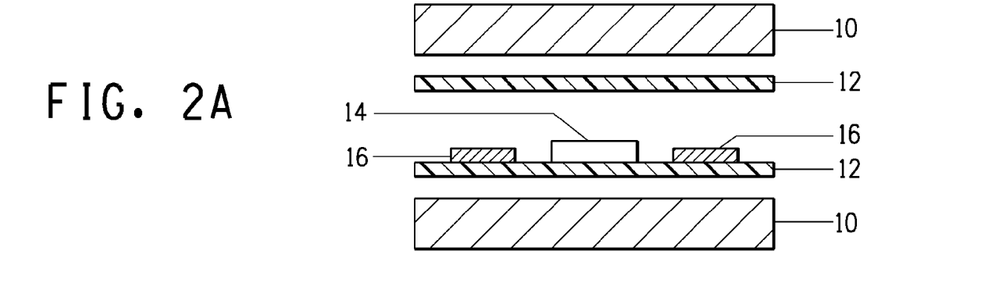
FIG. 2A illustrates a side view of a lamination assembly.
Figure 2B:
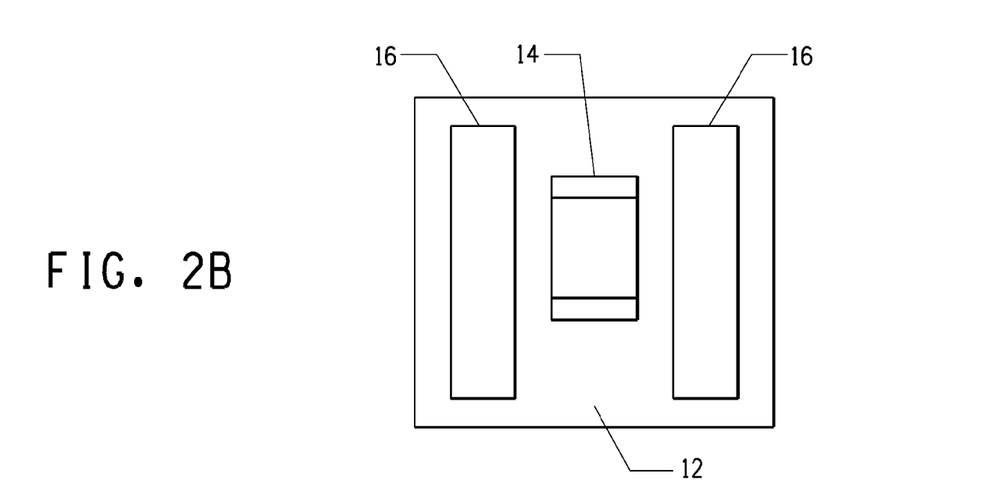
FIG. 2B illustrates a top-down view of a lamination assembly.

Method B: Prior to device assembly, ITO-PET (7 mil thick, ~90 ohm/sq) was cut into 3.5 cm×2.25 cm strips, washed with MeOH, and air dried. Electrochromic film was cut to dimension and applied to the conductive surface of the ITO-PET. A second piece of ITO-PET was placed on the electrochromic film so that the conductive surface was in contact with the electrochromic film. The resultant sandwich configuration was positioned so that the PET edges were staggered as shown in FIG. 1. A pressing apparatus prepared from two aluminum plates 10, Kapton® film 12, and 19 mil thick aluminum shim stock 16 was used to produce device assemblies 14 of uniform thickness (FIGS. 2A and 2B). Lamination was carried out by placing the lamination assembly between platens of a hot press at a temperature of 25° C., a pressure of 10,000 psig, and a hold time of 120 sec. Following lamination, a copper tape buss bar was applied along the edges of the exposed surface of ITO.

Method C: Electrochromic film was cut to size and applied to the conductive surface of a square piece of ITO-glass (2"×2", ~60 ohm/sq). A second square piece of ITO-glass (2"×2", ~60 ohm/sq) was placed on the opposing surface so that the conductive face of the glass made contact with the electrochromic film. The edges of the two pieces of glass were staggered so that the opposing edges of the ITO-glass surface extended beyond the edge (FIG. 1). The resultant device assembly was vacuum-sealed in a nylon bag. Lamination was accomplished using a United McGill air autoclave. A three-stage autoclave cycle was programmed where temperature and pressure were 1) slowly increased to 135° C./200 psig for 30 min, 2) held constant for 20 min at 135° C./200 psig, and c) slowly decreased to 25° C. and 0 psig for 20 min. Following lamination, a copper tape buss bar was applied along the edges of the exposed surface of ITO.

Method D:

Melt-blending using benzyl alcohol as a plasticizer was conducted in a similar manner to that described for 'Melt Compounding Method B.'

A 3-mil thick film was pressed from the plasticized composition using a conventional processing procedure. The electrochromic film was cut to size, applied to the conductive surface of a square piece of ITO-glass (2"×2", ~60 ohm/sq), and a second square piece of ITO-glass (2"×2", ~60 ohm/sq) was placed on the opposing surface so that the conductive face made contact with the electrochromic film. The edges of the two pieces of glass were staggered so that the opposing edges of the ITO-glass surface extended beyond the edge. The assembly was laminated between platens of a hot press at a temperature of 25° C., a pressure of 10,000 psig, and a hold time of 120 sec. Following lamination, a copper tape buss bar was applied along the edges of the exposed surface of ITO.

Electro-Optical Measurements

Electrochromic measurements cited in the examples and comparative examples include: initial light transmittance; final light transmittance; change in light transmittance; coloration time; and bleaching time. Transmittance was measured using an Ocean Optics GC-UV-NIR (light Source: DH-2000, detector: HR2000).

Initial Light Transmittance, T(initial): Initial light transmittance is defined as the amount of visible light that passes through the viewing area of an electrochromic device in the absence of voltage. This state defines the degree of coloration present in the electrochromic film prior to exposure to a voltage, when the device is said to be "off" or "bleached." The device was clamped equidistant (ca. 2") from the collimating lens of a fiber optic light source and a CCD detector and the UV-NIR spectrum was recorded. The percent light transmittance at 525 nm was recorded as T(initial).

Final Light Transmittance, T(final): Final light transmittance is the amount of visible light that passes through the viewing area of an electrochromic device upon application of voltage for a set period of time. This value estimates the maximum coloration of an electrochromic device. The device was situated equidistant (ca. 2") from the collimating lens of a fiber optic light source and a CCD detector and copper leads/alligator clips were attached to the copper buss bars. A constant potential (ranging from 0.5 to 6.5 V) was applied for 10 to 300 sec across the device using a BAS CV-50 W voltammetric analyzer in the bulk electrolysis mode. The percent light transmittance at 525 nm, following application of a particular voltage for a specified time, was defined as T(final).

Change in Light Transmittance, $\Delta T$: The change in percent light transmittance, $\Delta T$, is defined as:

$$\Delta T = T(\text{initial}) - T(\text{final})$$

Coloration Time, t(color): Velocity of coloration is defined as the time for a device to progress from the bleached to the colored state. Herein, t(color) is reported as the time at which 80% of the change in light transmittance has occurred. It was measured by subjecting a particular device to a constant voltage for 5 min, plotting transmittance as a function of time, determining T(−80%), and subsequently correlating T(−80')/0) to time using the aforementioned plot. T(−80%) was calculated from the equation:

$$T(-80\%) = T(\text{initial}) - (\Delta T \times 0.8)$$

Bleaching Time, t(bleach): Bleaching time is the time required for a particular device to be transformed from the colored to bleached state, and was determined by subjecting a particular device to a constant voltage for 5 minutes, followed by removal of the power supply. Bleaching time is the time interval between power supply removal and return to initial transmittance, T(initial).

Electro-Chromophore Synthesis:

Dibromominated poly(ethylene glycol): Thionyl bromide (FW=207.87 g/mol, 29.17 g, 0.14 mol) was dissolved in toluene (100 mL) and slowly added (45 min at room temperature) to a stirred solution of poly(ethylene glycol) (MW=1000 g/mol, 62.36 g, 0.0624 mol) and Et$_3$N (FW=101.19 g/mol, 6.33 g, 0.0625 mol) in toluene (400 mL). Upon complete addition, the reaction mixture was heated to 60° C. and stirred for 16 h under nitrogen. The resulting salt-laden, orange solution was subsequently cooled to room temperature, filtered, and the solvent removed in vacuo. Prolonged drying on high vacuum (at 60° C.) gave 65.6 g of the title compound as a viscous oil. $^1$H NMR (DMSO): $\delta$=3.77-3.72 (m, —CH$_2$Br), 3.61-3.50 (m, —OCH$_2$CH$_2$OCH$_2$—).

V1000: Dibrominated poly(ethylene glycol) (91.8 g) and 4,4'-dipyridyl (14.3 g) were dissolved in DMF (100 mL) and stirred at 80° C. under nitrogen for five days. The solvent was removed under reduced pressure, followed by prolonged high vacuum drying (at 60° C.) to afford 104 g of the electoresponsive copolymer, V1000.

V200-Cl: 4,4'-Dipyridyl (9.88 g) was taken up in 100 mL of dry DMF. This solution was placed in a 100 mL 3-neck, round bottom flask connected to a N$_2$ bubbler. Chlorinated PEO (Cl-PEO-Cl, 15.0 g) was added to 4,4'-dipyridyl solution, with stirring. Additional DMF (3 mL) was used to rinse the rest of the chlorinated PEO into the flask. The flask was kept under a nitrogen purge while being heated at 115° C. overnight. The solvent was then removed via roto-evaporation. The resulting product was obtained as a yellow, slightly viscous oil.

Example 1

PVB-Plasticizer Compatibility

This example provides PVB-plasticizer compatibility data for 5 different plasticizers at loadings between 0 and 80% in PVB. PVB was supplied as dry flake from DuPont Glass Laminating Solutions (GLS), Wilmington, Del.

Table 1 shows representative DSC data for various plasticizers tested for compatibility with PVB. The glass transition temperature was determined according to Polymer-Plasticizer Compatibility Method B. Table 1 also shows the loading at which point exudation was visible, which provides an estimate of the maximum loading for a particular PVB-plasticizer combination.

TABLE 1

DSC Data for various PVB/Plasticizer Blends

| Loading, Wt. % | Plasticizer | | | | | |
|---|---|---|---|---|---|---|
| | 3GO $T_g$ (° C.) | EHD $T_g$ (° C.) | P2P $T_g$ (° C.) | S141 $T_g$ (° C.) | PC $T_g$ (° C.) | BzOH $T_g$ (° C.) |
| 0 | 72.6 | 72.8 | 66.7 | 73.3 | 65.0 | 72.0 |
| 20 | 22.0 | 13.9 | 26.9 | 34.5 | 17.7 | 15.4 |
| 40 | 5.2 | −13.4 | 9.4 | 1.3 | Ex | −30.2 |
| 60 | Ex | −44.9 | −40.1 | Exudation | Exudation | −52.1 |
| 80 | Ex | −57.6 | −50.3 | Exudation | Exudation | — |

Figure 3:
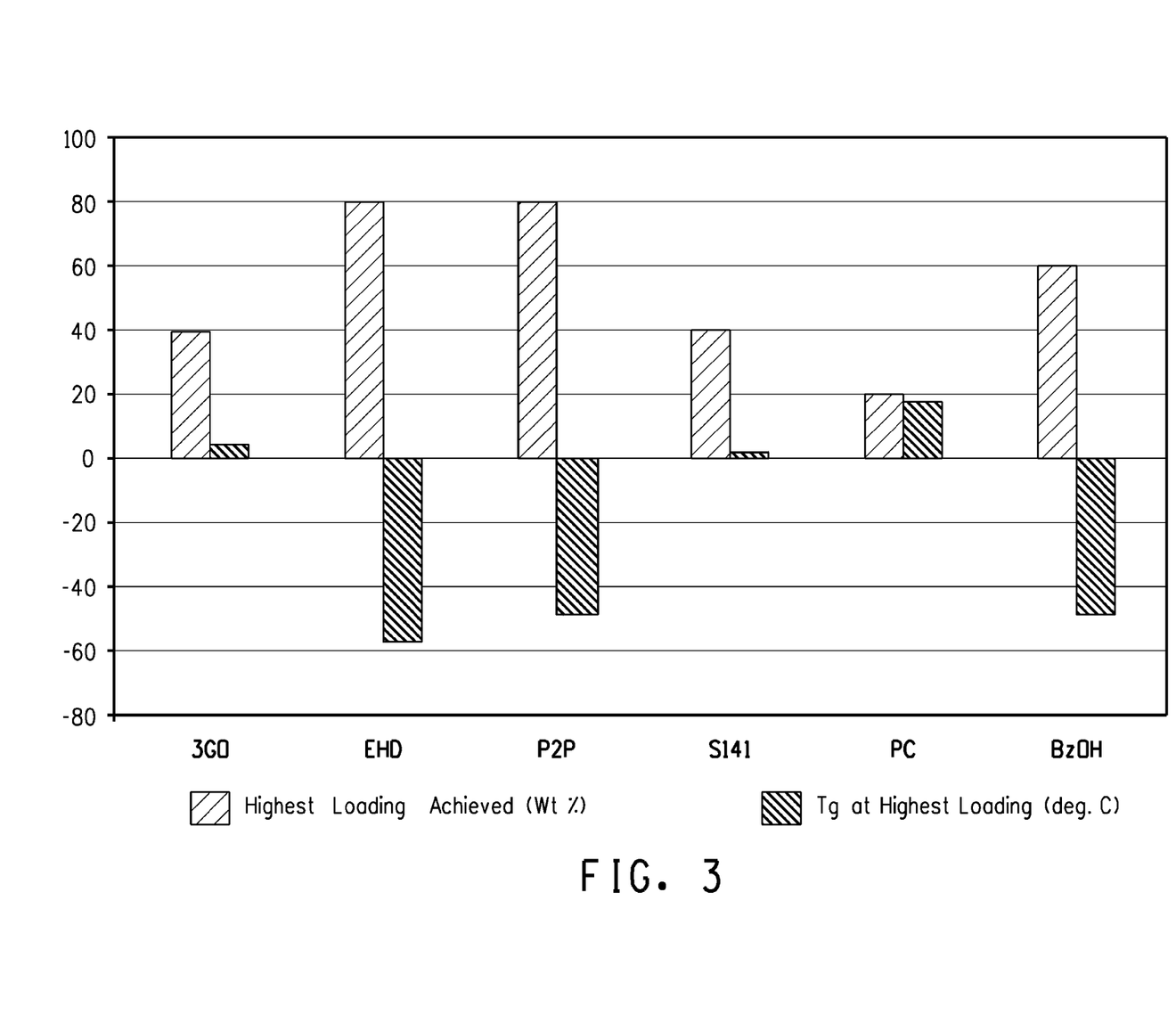
FIG. 3 shows the highest loadings achieved and the $T_g$ at highest loading for six different PVB plasticizers.

This data can also be shown using a bar graph. FIG. 3 depicts: 1) the highest possible plasticizer loading, and 2) the lowest possible glass-transition temperature ($T_g$) for a given plasticizer in PVB. The higher the loading and the lower the $T_g$, the better the electrochromic device will perform. Thus, these parameters should be maximized, but without destroying the structural integrity of the resultant electrochromic film (i.e., its ability to maintain its shape in the absence of a supporting substrate). Although 3GO, S141 and PC are commonly used plasticizers, as shown by this data, they would be less effective than EHD or P2P as plasticizers for PVB. They may, however, be effective plasticizers for other film-forming polymers.

Example 2

Additives-Plasticizer Compatibility

The compatibility (or solubility) of the various electrochromic film additives with the plasticizer also affects device performance. It has been found that the more soluble the set of additives is within a particular plasticizer-polymer matrix, the faster the switching speed and coloring of a resultant electrochromic device. Table 2 shows the solubility of various electrochromophores, salts and electron mediators in various plasticizers. Solubility of less than 0.05 mg/mg is considered to be "insoluble." Solubility of 0.05 mg/mg up to 0.5 mg/mg is considered to be "partially soluble." Solubility of 0.5 mg/mg or greater is considered to be "soluble."

TABLE 2

Solubility of Additives in Various Plasticizers

| | Plasticizers | | | | |
|---|---|---|---|---|---|
| Additives | 3GO (mg/mg) | EHD (mg/mg) | P2P (mg/mg) | S141 (mg/mg) | PC (mg/mg) |
| V-1000 | 0 | 0.5 | 0.5 | 0 | 0.5 |
| V-200 | 0 | 0.5 | 0.5 | 0 | 0.5 |
| LiCl | 0 | 0.15 | 0 | 0 | 0 |
| TBAB | 0 | 0.5 | 0.5 | 0.5 | 0.5 |
| Fc | 0.05 | 0 | 0.1 | 0.15 | 0.05 |
| Bu Fc | 0.5 | 0.5 | 0.5 | 0.5 | 0.5 |
| LiOTf | 0.05 | 0.30 | 0.25 | 0.15 | 0.5 |

* 0.5 mg/mg is the maximum amount attempted.

As indicated by the data in Table 2, EHD, P2P and PC are effective plasticizers for at least one of the electrochromophores, one of the salts and one of the electron mediators tested. 3GO and S141 effectively dissolve the salts and electron mediators, but do not dissolve these particular electrochromophores.

Comparative Example A

Electrochromic Device Using 3GO as Plasticizer

An electrochromic device was prepared following 'Melt Compounding Method A,' 'Film Preparation Method A,' and 'Device Construction Method A.' The composition of the device was 67 wt % PVB, 23 wt % 3GO, 8 wt % V-1000, 8 wt % BuFc, and 1.6 wt % TBAB. The electro-optical performance obtained from a thermoplastic device made using 3GO plasticizer is given in Table 3.

TABLE 3

Performance of Electrochromic Device using 3GO as Plasticizer

| T(initial) (%) | ΔT (%) | t(color) (h) | t(bleach) (weeks) | Voltage (V) | Film Thickness (mil) |
|---|---|---|---|---|---|
| 61.9 | 4.0 | 12.0 | 1 | 6.5 | 6 |

Although this device exhibits a high T(initial), it is sluggish to develop full color and to bleach, requiring 12 h and 6.5 volts to reduce light transmittance by only 4%.

Example 3

Electrochromic Devices Using V-200 as Electrochromophore

This example shows the initial light transmittance for thermoplastic electrochromic compositions prepared using electrochromophore, V-200. In all examples, electrochromic film component levels were held constant, while the plasticizer, electron mediator and salt were varied. In all instances, the polymer was PVB (15 g, 30 wt %), the electrochromophore was V-200 (6.0 g, 12 wt %), the plasticizer was 27.0 g (55 wt %), the electron mediator was 0.8 g (1.5 wt %) and the salt was 0.8 g (1.5 wt %). Devices were prepared using 'Melt Compounding Method B,' 'Film Preparation Method B,' and 'Device Construction Method B.' Table 4 provides T(initial) for thermoplastic electrochromic devices made from various compound combinations.

TABLE 4

Initial Transmittance Data for Electrochromic Devices using V-200 as Electrochromophore

| Plasticizer | Salt | Mediator | T(initial) (%) |
|---|---|---|---|
| EHD | LiCl | Bu Fc | 27.0 |
| EHD | LiCl | Fc | 16.7 |
| EHD | TBAB | Bu Fc | 27.0 |
| EHD | TBAB | Fc | 33.3 |
| P2P | LiCl | Bu Fc | 56.6 |
| P2P | LiCl | Fc | 39.6 |
| P2P | TBAB | Bu Fc | 17.9 |
| P2P | TBAB | Fc | 30.2 |
| S141 | LiCl | Bu Fc | 16.5 |
| S141 | LiCl | Fc | 14.3 |
| S141 | TBAB | Bu Fc | 18.5 |
| S141 | TBAB | Fc | 12.2 |

Example 4

Electrochromic Devices Using V-1000 as Electrochromophore

This example compares the electrochromic performance attributes for thermoplastic compositions made from various plasticizers, salts, and mediators for a constant composition. Component levels were held constant, while the specific component types were varied. In all instances, the polymer was PVB (15 g, 30 wt %) and the electrochromophore was V-1000 (6 g, 12 wt %), the plasticizer was 27.0 g (55 wt %), the electron mediator was 0.8 g (1.5 wt %) and the salt was 0.8 g (1.5 wt %). Devices were prepared using 'Compounding Method B,' 'Film Preparation B,' and 'Device Construction B.' Table 5 provides T(initial), ΔT, and t(color) for the various electrochromic film component combinations. Each measurement was taken in 3 times, and the average and standard deviation is reported.

TABLE 5

Performance of Electrochromic Devices made using V-1000 as Electrochromophore

| Plasticizer | Salt | Mediator | T(initial) (%) | ΔT (%) | t(color) (sec) |
|---|---|---|---|---|---|
| EHD | TBAB | Bu Fc | 70.4 +/− 0.4 | 46.6 +/− 1.8 | 118.3 +/− 18.4 |
| EHD | TBAB | Fc | 67.6 +/− 0.5 | 57.1 +/− 1.7 | 134.7 +/− 18.9 |
| EHD | LiCl | Bu Fc | 65.7 +/− 0.4 | 39.6 +/− 0.4 | 149.3 +/− 3.5 |
| EHD | LiCl | Fc | 70.4 +/− 0.6 | 45.9 +/− 1.2 | 156.3 +/− 6.1 |
| P2P | LiCl | Bu Fc | 51.8 +/− 0.2 | 33.3 +/− 1.1 | 166.7 +/− 1.5 |
| P2P | LiCl | Fc | 57.3 +/− 2.5 | 32.1 +/− 7.2 | 131.3 +/− 4.7 |
| P2P | TBAB | Fc | 66.3 +/− 1.8 | 57.4 +/− 5.7 | 106.7 +/− 4.0 |
| P2P | TBAB | Bu Fc | 51.3 +/− 1.5 | 31.3 +/− 1.2 | 92 +/− 42 |
| S141 | TBAB | Bu Fc | 60.0 +/− 1.0 | 20.1 +/− 0.5 | 200 +/− 8 |
| S141 | LiCl | Fc | 24.3 +/− 2.7 | 0.1 +/− 0.1 | 0.0 |
| S141 | LiCl | Bu Fc | 43.3 +/− 0.7 | 0.3 +/− 0.3 | 0.0 |
| S141 | TBAB | Fc | 61.3 +/− 0.4 | 23.5 +/− 0.5 | 185.7 +/− 7.5 |

As evidenced by this data, electrochromic compositions prepared with V-1000 maximize light transmittance in the off (bleached) state, T(initial). It was found that electrochromic devices comprised of plasticizers that solubilize both the electrochromophore and the polymer (e.g., P2P and EHD) operated at a faster rate (smaller t(color)) and changed the light more significantly (larger ΔT) than those which were immiscible (e.g., S141). Also, for S141, devices containing soluble TBAB are moderately functional, whereas those made from insoluble LiCl are non-functional.

Example 5

Electrochromic Devices with Increasing Plasticizer Levels

This example shows the effect of plasticizer loading on t(color).

In this example, the amount of V-1000 is held constant at 12 wt %, BuFc is 1.6 wt %, and TBAB is 1.6 wt %. The amount of plasticizer (EHD) is varied from 55-65 wt %, with the balance being PVB. At 65 wt % EHD, the material is a gel. Devices were prepared using 'Compounding Method B,' 'Film Preparation B,' and 'Device Construction B.' Device performance is summarized in Table 6.

TABLE 6

Performance of Electrochromic Devices containing various Plasticizer Levels

| Composition | | | | | Device Performance | | | |
|---|---|---|---|---|---|---|---|---|
| PVB (Wt. %) | EHD (Wt. %) | V-1000 (Wt. %) | Bu Fc (Wt. %) | TBAB (Wt. %) | T (initial) (%) | ΔT (%) | t (color) (sec) | t (bleach) (min) |
| 30 | 55 | 12 | 1.6 | 1.6 | 67.6 | 57.1 | 134.7 | <5 |
| 25 | 60 | 12 | 1.6 | 1.6 | 69.9 | 66.3 | 56.8 | <5 |
| 20 | 65 | 12 | 1.6 | 1.6 | 70.0 | 62.4 | 32.4 | <5 |

Example 6

Validation and Repeatability of Electrochromic Device Performance

In this example, the device performance was tested 15 times of a film of composition of PVB=25 wt %, EHD=60 wt %, V-1000=12 wt %, BuFc=1.6 wt %, and TBAB=1.6 wt %. Devices were prepared using 'Melt Compounding Method B,' 'Film Preparation Method B,' and 'Device Construction Method B.' The ranges, mean ($\bar{\chi}$) and standard deviation ($\sigma$) for the 15 tests are given in Table 7.

TABLE 7

Mean and Standard Deviation of Electrochromic Device Performance

| | T(initial) (%) | ΔT (%) | t(color) (sec) |
|---|---|---|---|
| Range | 64-77 | 63-72 | 48.9-63.1 |
| $\bar{\chi}$ | 70.5 | 68.1 | 54.8 |
| $\sigma$ | 2.9 | 2.4 | 4.8 |

Example 7

Performance for an Electrochromic Device Made Via Autoclave Lamination

This example shows performance data for a 2"×2" device made via autoclave lamination ('Melt Compounding Method B,' 'Film Preparation Method B,' 'Device Construction Method C'). The film composition was PVB (30 wt %), EHD (55 wt %), V-1000 (12 wt %), BuFc (1.6 wt %), and TBAB (1.6 wt %).

TABLE 8

Performance of an Electrochromic Device made via Autoclave Lamination

| T(initial) (%) | ΔT (%) | t(color) (min) | T(bleach) (min) |
|---|---|---|---|
| 68.2 | 42.3 | 237.0 | <10 |

Example 8

Electrochromic Device Using Benzyl Alcohol as Plasticizer

An electrochromic composition was prepared by mixing benzyl alcohol (5400 mg, 50.33 wt %), 1-ethyl-methyl-1H-imidazolium chloride (175 mg, 1.63 wt %), V-200-Cl (2810 mg, 26.19 wt %), TBAB (175 mg, 1.63 wt %), PVB (29.18% OH, 1995 mg, 18.59 wt %), and 5,10dihydro-5,10dimethyl phenazine (175 mg, 1.63 wt %) according to 'Melt Compounding Method B.' An electrochromic device was prepared using 'Film Preparation Method B' and 'Device Construction Method B.'

The performance was tested at 550 nm using −1.1 V, and the data is summarized in Table 9.

TABLE 9

Performance of an Electrochromic Device using Benzyl Alcohol as Plasticizer

| T(initial) (%) | ΔT (%) | T(color) (sec) | T(bleach) (sec) |
|---|---|---|---|
| 60 | 45 | 38 | 8 |

What we claimed is:

1. A composition consisting essentially of:
(a) 10-60 wt % of a polymer selected from the group of amorphous, film-forming polymers with $T_g$ less than 100° C.;
(b) 40-90 wt % of a plasticizer mixture, wherein the plasticizer mixture consists essentially of:
(i) a plasticizer, wherein the plasticizer is soluble in the polymer to at least 45 wt %;
(ii) an electrochromophore, wherein the electrochromophore is soluble in the plasticizer to at least 10 wt % and wherein the concentration of the electrochromophore in the composition is from 1 to 30 wt %;
(iii) an electron mediator selected from the group consisting of ferrocene, butyl ferrocene, ferrocene carboxylic acid, phenazine and its derivatives, carbazole and its derivatives, phenothiazine and its derivatives, and phenanthroline and its derivatives, wherein the concentration of the electron mediator in the composition is from 0.1 to 10 wt %; and,
(iv) a salt selected from the group consisting of lithium chloride, tetrabutylammonium bromide, lithium bis(trifluoromethanesulfonyl)imide, lithium triflate, and lithium hexafluorophosphate, wherein the concentration of the electron mediator in the composition is from 0.1 to 10 wt %, and wherein the melting point of the plasticizer is not above about 0° C., the boiling point of the plasticizer is above about 190° C. at a pressure of 1 atmosphere, and the solubility in the plasticizer of the electron mediator and the salt are each at least 0.5 mg per mg of plasticizer.

2. The composition of claim 1, wherein the amorphous film-forming polymer is selected from the group consisting of polyvinyl butyral, polyvinyl chloride, polycarbonate, polyvinyl alcohols, acrylate (co)polymers, ethylene-vinyl alcohol copolymers, ethylene-acrylate copolymers, ethylene-CO-acrylate terpolymers, and polyurethanes.

3. The composition of claim 1, wherein the plasticizer is selected from the group consisting of linear carbonates; cyclic carbonates; $C_7$-$C_{10}$ linear primary alcohols; linear and branched $C_5$-$C_{12}$ aliphatic diols, linear and branched $C_5$-$C_{12}$ aliphatic triols; benzyl alcohol; 1-phenoxy-2-propanol; linear and cyclic ureas; linear or cyclic urethanes; thioureas; thiourethanes; linear thio-oxocarbonates; pyrrolidon-2-ones; dihydrofuran-2-ones; piperidin-2-ones; pyran-2-ones; substituted imidazolium salts; 3-methanesulfinylmethyl-heptane; 2-(2-butoxyethoxy)ethanol;

bis-cyclics of Structure II,

Structure II where X is O, S, or NH;

Z is a linking group selected from $CH_2$, $C(CH_3)_2$, $CHCH_3$, $CH_2CH_2$, $CH_2CH_2CH_2$, O, S, SO, $SO_2$, NH, $N(CH_3)$, C=O, C(O)O, C(O)NH, $CH_2C$=O, $CH_2C(O)O$, $CH_2C(O)NH$, $CH_2C(O)CH_2$, and A is independently selected from the group consisting of H and $C_4$-$C_{12}$ linear or branched alkyl groups, optionally substituted with one to six OH groups; and phosphorus compounds selected from the group consisting of:

wherein R is independently selected from the group consisting of $C_4$-$C_{12}$ linear and branched alkyl groups, optionally substituted with one to six OH groups.

4. The composition of claim 1, wherein the plasticizer is selected from the group consisting of propylene carbonate; 4-(hydroxymethyl)-1,3-dioxolan-2-one; carbonic acid dibutyl ester; 1-(3-hydroxypropyl)-2-pyrrolidone; 1-octyl-2-pyrrolidone; 5-dodecanolide; 1-hexyl-3-methylimidazolium chloride; 1-methyl-3-octylimidizolium chloride; 2,2-dimethyl-1,3-hexanediol; 2-methyl-1,3-pentanediol; 1-cyclohexyl-2-methyl-1,3-pentanediol; 2,4-diethyl-1,5-pentanediol; 1,3-nonanediol; 2-butyl-1,3-octanediol; 3-methylpentane-1,3,5-triol; 2-ethyl-1,3-hexanediol; benzyl alcohol; 3-methyl-1,5-pentanediol; 1-phenoxy-2-propanol; 2-(2-butoxyethoxy)ethanol; bis(2-ethylhexyl)phosphate; tributyl phosphate; and tris(2-ethylhexyl)phosphate.

5. The composition of claim 1, wherein the electrochromophore is a copolymer of 4-4'-dipyridyl and poly(ethylene glycol).

6. The composition of claim 5, wherein poly(ethylene glycol) has a molecular weight of about 100 to about 2000 Daltons.

7. A composition of claim 1 obtained by mixing:
(a) 10-60 wt % of a polymer selected from the group of amorphous, film-forming polymers with $T_g$ less than 100° C.; with
(b) 40-90 wt % of a plasticizer mixture, wherein the plasticizer mixture comprises:
(i) a plasticizer, wherein the plasticizer is soluble in the polymer to at least 45 wt %;
(ii) an electrochromophore, wherein the electrochromophore is soluble in the plasticizer to at least 10 wt %;
(iii) an electron mediator selected from the group consisting of ferrocene, butyl ferrocene, ferrocene carboxylic acid, phenazine and its derivatives, carbazole and its derivatives, phenothiazine and its derivatives, and phenanthroline and its derivatives; and
(iv) a salt selected from the group consisting of lithium chloride, tetrabutylammonium bromide, lithium bis(trifluoromethanesulfonyl)imide, lithium triflate, and lithium hexafluorophosphate, wherein the melting point of the plasticizer is not above about 0° C., the boiling point of the plasticizer is above about 190° C. at a pressure of 1 atmosphere, and the solubility in the plasticizer of the electron mediator and the salt are each at least 0.5 mg per mg of plasticizer.

* * * * *